Jan. 12, 1954

C. A. CRAWFORD ET AL 2,666,128

ELECTRIC APPLIANCE STAND

Filed Feb. 23, 1951

Inventor
CLARK A. CRAWFORD
AND JOHN F. FRAZIER
By Rolf E. Schneider
Attorney

Patented Jan. 12, 1954

2,666,128

UNITED STATES PATENT OFFICE 2,666,128

ELECTRIC APPLIANCE STAND

Clark A. Crawford and John F. Frazier, Corning, N. Y., assignors to Corning Glass Works, Corning, N. Y., a corporation of New York Application February 23, 1951, Serial No. 212,366

9 Claims. (Cl. 219—43)

The present invention relates to a stand adapted to connect the terminals of a source of electric current with the terminals of an electrically actuated appliance arranged thereon and is particularly directed to the provision of certain safety features in connection with such a stand designed for manual operation.

The use of appliances with integral elements for heating or other purposes and designed for operation by electric current supplied thereto by a stand has become widespread. Such stands are customarily provided with current supply electrodes adapted to be engaged and depressed by the terminals of the appliance upon placement of the appliance thereon. To protect the user against electric shock it has been customary to provide in the stand facilities for preventing the connection of current to the electrodes until they have been made inaccessible to the user by placement of the appliance on the stand.

When the appliance is in the form of a glass cooking vessel it is particularly desirable also that all possible precautions be taken to prevent the inadvertent connection of current thereto when the vessel is empty since otherwise overheating and resultant damage to the vessel are likely to occur. The prevention of such overheating becomes particularly important when the glass vessel comprises a tempered bowl provided with an electrically conducting coating, e. g., a coffee-maker bowl as described in Crawford-Miller Patent No. 2,609,478.

The present invention provides a simplified but novel arrangement for accomplishing these and other safety features in such a stand adapted for connection of the current source with the appliance by means of a manually operated switch. In accordance with the invention, there is provided means cooperative with one of the current-supply electrodes to prevent operation of the switch member when the stand is unoccupied and to permit operation thereof only upon placement of the appliance upon the stand in a position to engage and depress the electrodes. There may also be included in this arrangement means for automatically restoring the switch member to its initial position upon removal of the appliance from the stand. Where the appliance is designed for the application of heat, means may be additionally provided for automatically restoring the switch member in the event that the temperature of the appliance while it is on the stand exceeds a predetermined value.

The details of the present invention will be readily apparent from the following description thereof taken in connection with the accompanying drawing, in which.

Figure 1:
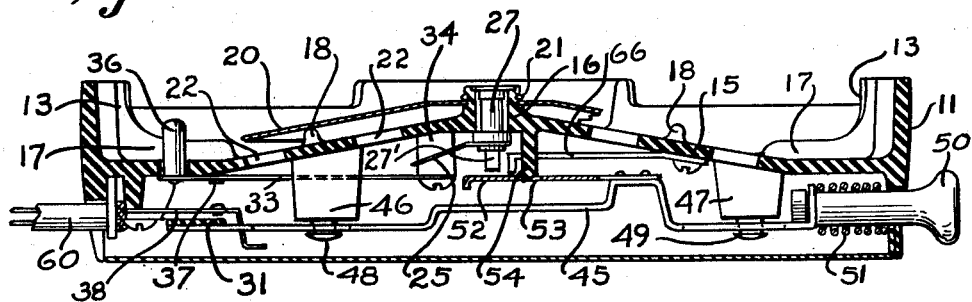
Fig. 1 is a sectional elevation of a stand comprising one form of embodiment of the invention, with the electrodes and the switch member in their normal positions.

As shown in the drawing, the stand assembly includes a circular base of a suitable dielectric material, for example, a plastic, having a shallow cylindrical band 11 provided with a number of upwardly projecting appliance-confining elements 13. Band 11 surrounds a generally convex disc 15 having a central hub 16 and, in the area adjoining band 11, provided with a number of appliance-support fins 17 desirably formed integrally with the elements 13. Intermediate fins 17 and hub 16 are a number of bosses 18. A heat deflector 20, which may be formed of metal, surrounds hub 16 and is held thereto and against bosses 18 by a split ring 21 occupying a groove in hub 16. Disc 15 has several apertures 22 provided to permit free circulation of air to aid deflector 20 in protecting the base from attaining an objectionable temperature during use of the appliance.

A spring 25 secured to a boss 26 (Fig. 3) formed on the bottom side of disc 15, resiliently supports a current-supply electrode comprising a plunger 27 extending up into the bore of hub 16. The other end of spring 25 is connected by a conductor 29 with a contact spring 28. Spring 28 is cooperative with a contact spring 30 having its free end bent down for operative engagement by an actuator 31.

A spring 33 is secured at one end to a boss 34 and at the other end resiliently supports a current-supply electrode comprising a plunger 36 passing through an aperture in disc 15 outside the lateral limit of deflector 20. Spring 33, near the end carrying plunger 36, is provided with a contact 37 adapted for engagement with a contact carried by a spring 38 having its free end bent upward in a manner to adapt it for movement by the actuator 31. The space between the contact 37 and that of spring 38 is such however that plunger 36 must be depressed to bring contact 37 within the operating range of spring 38.

Figure 3:
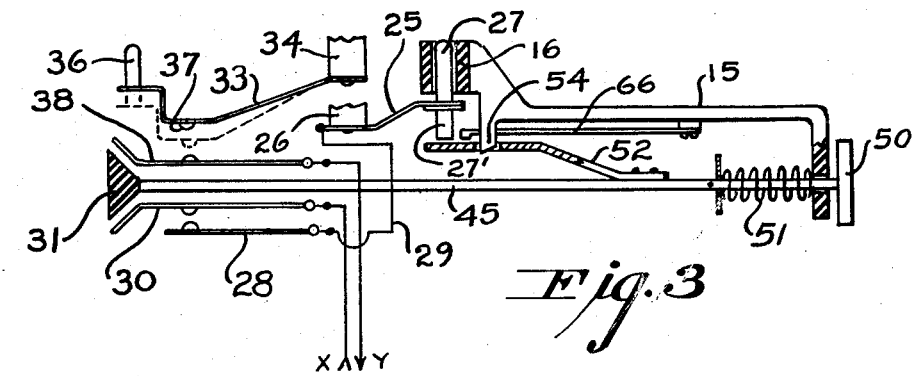
Fig. 3 is a schematic fragmentary view partly in section illustrating the essential operative elements of the stand and the electrical connections thereto.

The actuator 31 is mounted on one end of a member 45 slidably attached to bosses 46 and 47 by cap screws 48 and 49 respectively. The other end of member 45 is provided with a manually operable knob 50. A spring 51 normally tends to retain member 45 in its normal position, in which it is shown in Figs. 1 and 3.

Figure 2:
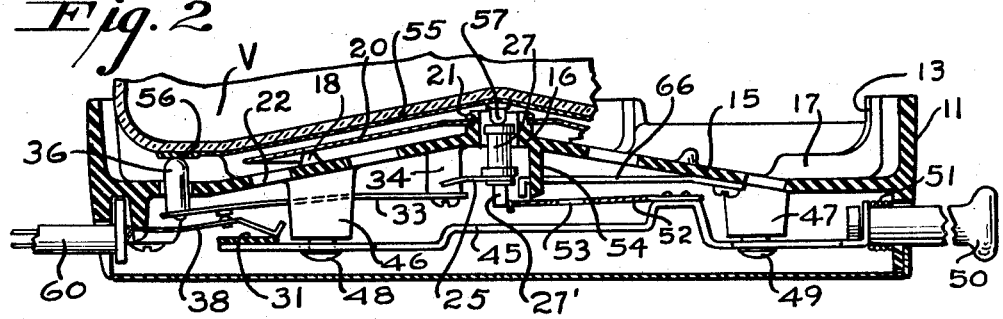
Fig. 2 is a similar view showing a fragment of an electrically heated vessel on the stand, with the electrodes and the switch member in their alternative positions.

In accordance with the invention member 45 is provided intermediate its ends with a resilient lock member 52 having an aperture 53 normally occupied by a stationary dog 54 which is integral with the disc 15 and which normally prevents movement of the slide member 45 to its alternative position. The free end of member 52 normally projects below extension 27' on the lower end of plunger 27 which upon being suitably depressed, as when the stand is occupied by an appliance such as vessel V, engages member 52 and lowers it clear of dog 54. (As indicated in Fig. 2, vessel V may comprise a glass bowl having an electrically conducting coating 55 on its base and provided with a peripheral terminal 56 for engagement with plunger 36 and with a central terminal having a projection 57 for engagement with plunger 27.)

With member 52 held clear of dog 54, knob 50 may be seized and the slide member 45 pulled out against the tension of spring 51 to a position in which actuator 31 brings the contacts of springs 30 and 38 into engagement with the contacts of springs 28 and 33 respectively. In the movement of slide member 45 to its alternative position the free end of lock member 52 is moved from under plunger extension 27' while aperture 53 is moved out of register with dog 54. Member 52 thereupon springs back to the upward position shown in Fig. 2. Return of member 45 under the influence of spring 51 is therefore prevented since the extension 27' of plunger 27 is now in the return path of member 52.

Engagement of the contacts of springs 30 and 38 with the respective contacts of springs 28 and 33 establishes electrical connection of the current supplied by a cord 60 to the appliance via plungers 27 and 36. As depicted in Fig. 3 current is supplied to the conducting coating 55 of vessel V from a current source terminal X, through springs 30 and 28, conductor 29, spring 25, and plunger 27, and returns through plunger 36, springs 33 and 38 to the Y terminal of the same current source.

The disconnection of current is effected by momentarily lifting the vessel from the stand to permit plunger 27 to restore to its initial position under the influence of its supporting spring 25. As soon as plunger extension 27' is raised clear of member 52, spring 51 is enabled to effect the restoration of the member 45 and the respective parts under its control to their original positions.

To provide for the automatic disconnection of the current source should the vessel approach the limit of its safe operating temperature, there is provided a thermostat 66 adapted to, as such temperature is approached, move member 52 downward sufficiently to clear extension 27' of plunger 27 while such plunger remains in its depressed position, thus enabling spring 51 to restore member 45 and the respective parts under its control to their initial positions.

By means of the present arrangement, then, connection of the current source can only be effected by actual placing of the appliance on the stand so that accidental heating of glass and similar vessels is substantially eliminated.

What is claimed is:

1. In a stand for an appliance having an electric heating element, resiliently supported current-supply electrodes adapted to be engaged and moved to an alternative position by the terminals of the heating element of the appliance upon its deposit on the stand, an operating circuit for said element including a pair of contacts a first of which is adapted to be moved to an alternative position by one of said electrodes in its movement to its alternative position, a normally locked mechanism for moving the second contact of said pair to a position to engage the first contact when such first contact is occupying its alternative position, said mechanism being adapted to be unlocked by the other of said electrodes in its movement to its alternative position, and a manually operable member for actuating said mechanism to move the second of said contacts to a position to engage the first thereof when the same is occupying its alternative position.

2. A structure such as defined by claim 1, which includes means energized by movement of said member from its normal to its alternative position for restoring said member and said mechanism to their normal positions.

3. A structure such as defined by claim 2, which includes means for preventing restoration of said member while said other electrode remains in its alternative position.

4. A structure such as defined by claim 3, wherein temperature responsive means is provided to disable said last means.

5. In a stand for an appliance having an electric heating element, two current-supply electrodes adapted to be depressed by the terminals of the heating element of the appliance upon its deposit on said stand, a circuit for said element including contacts connected to said electrodes, one of said contacts being moved to an alternative position upon depression of its electrode, a manually operable member having contacts associated therewith and included in said circuit for connection of the terminals of a current source to said first contacts after said electrodes have been depressed, and locking means normally preventing the operation of said manually operable member and adapted to be released by one of said electrodes upon its depression.

6. In an electrical appliance stand assembly, an apertured appliance support, a pair of resiliently supported current-supply electrodes projecting up through apertures in said support and adapted to be engaged and depressed by the terminals of an appliance upon its deposit on said support, a manually operable member for connecting the terminals of a current source with said electrodes, a spring tensioned during the operation of said member to effect its subsequent restoration, means to prevent the operation of said manually operable member, one of said electrodes upon being depressed being cooperative with said means to free such member for operation, said means in part being cooperative with one of said electrodes for preventing the restoration of said member until such electrode has been restored to its initial position.

7. A structure such as defined by claim 6, which includes a temperature responsive means for disabling the last defined part of said other means.

8. In a stand for an electrically heated appliance, an electrode adapted to be engaged and depressed by a heating element terminal of such appliance when the same is deposited on the stand, a member movable between two alternative positions to establish and disestablish electrical connection between said electrode and a current supply terminal, and a movable element cooperative with a fixed portion of said stand to prevent movement of said member, one of said electrodes being adapted, upon movement to its depressed position, to move said element clear of said fixed stand portion, said element being thereupon cooperative with said electrode to prevent restoration of said member until said electrode has been restored to its initial position.

9. A structure such as defined by claim 8, which includes means for restoring said member and a thermally operable device for disabling said element from being any longer cooperative with said electrode to prevent restoration of said member in case an appliance arranged on the stand attains a predetermined temperature.

CLARK A. CRAWFORD.
     JOHN F. FRAZIER.

References Cited in the file of this patent

UNITED STATES PATENTS

| Number | Name | Date |
|---|---|---|
| 1,637,155 | Marsden | July 26, 1927 |
| 1,994,877 | Shoop et al. | Mar. 19, 1935 |
| 2,269,689 | Reichold | Jan. 13, 1942 |
| 2,287,584 | Weeks | June 23, 1942 |
| 2,445,591 | Sullivan | July 20, 1948 |

FOREIGN PATENTS

| Number | Country | Date |
|---|---|---|
| 364,271 | Great Britain | Jan. 7, 1932 |
| 374,971 | France | June 23, 1932 |